US011005993B2

United States Patent
Golden et al.

(10) Patent No.: US 11,005,993 B2
(45) Date of Patent: May 11, 2021

(54) COMPUTATIONAL ASSISTANT EXTENSION DEVICE

(71) Applicant: Google Inc., Mountain View, CA (US)

(72) Inventors: Adam Bradley Golden, Mountain View, CA (US); William Gerard Donnelly, Sunnyvale, CA (US); Yonatan Zunger, Mountain View, CA (US); Leonardo Kusumo, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 50 days.

(21) Appl. No.: 15/650,398

(22) Filed: Jul. 14, 2017

(65) Prior Publication Data
US 2019/0020761 A1   Jan. 17, 2019

(51) Int. Cl.
*G10L 15/22* (2006.01)
*H04M 3/493* (2006.01)
*G06F 3/16* (2006.01)
*G06F 16/435* (2019.01)
*G06F 16/9032* (2019.01)

(52) U.S. Cl.
CPC .......... *H04M 3/4936* (2013.01); *G06F 3/167* (2013.01); *G06F 16/435* (2019.01); *G06F 16/90332* (2019.01); *G10L 15/22* (2013.01); *H04M 3/4938* (2013.01); *H04M 2201/40* (2013.01); *H04M 2250/74* (2013.01)

(58) Field of Classification Search
CPC ... G10L 15/22; G10L 2015/223; G10L 15/08; G10L 15/26; G10L 15/30; G06F 3/167
See application file for complete search history.

(56) References Cited

U.S. PATENT DOCUMENTS 9,668,052 B2 *  5/2017  Lombardi ........... H04L 12/2838
9,898,250 B1 *  2/2018  Williams ................ G06F 3/167
(Continued)

OTHER PUBLICATIONS

Luckerson, "Google Prototype Wearable Mimics 'Star Trek' Communicator," retrieved from: http://time.com/4121895/google-star-trek-communicator/, Nov. 22, 2015, 2 pp.
(Continued)

*Primary Examiner* — Mark Villena
(74) *Attorney, Agent, or Firm* — Middleton Reutlinger

(57) ABSTRACT

An example method includes receiving, by a computational assistant executing at one or more processors of a mobile computing device and via a wireless link between the mobile computing device and an external device, a representation of audio data generated by a microphone of the external device, the audio data representing a spoken utterance detected by the external device; determining, by the computational assistant and based on the audio data, a response to the spoken utterance; and sending, by the mobile computing device, to the external device, and via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

16 Claims, 5 Drawing Sheets

(56) References Cited

U.S. PATENT DOCUMENTS

| | | | |
|---|---|---|---|
| 2005/0129385 A1* | 6/2005 | Speasl | H04N 5/907 386/230 |
| 2007/0060118 A1* | 3/2007 | Guyette | H04M 1/72533 455/420 |
| 2011/0066634 A1* | 3/2011 | Phillips | G10L 15/22 707/769 |
| 2015/0086034 A1* | 3/2015 | Lombardi | H04L 12/2838 381/81 |
| 2015/0088518 A1* | 3/2015 | Kim | G06F 3/167 704/251 |
| 2017/0004828 A1* | 1/2017 | Lee | G10L 25/63 |
| 2017/0160813 A1* | 6/2017 | Divakaran | G06F 3/017 |
| 2017/0257470 A1* | 9/2017 | Youn | H04M 1/72583 |
| 2017/0262537 A1* | 9/2017 | Harrison | G06F 17/30746 |
| 2018/0063249 A1* | 3/2018 | Nguyen | H04L 67/125 |
| 2018/0293982 A1* | 10/2018 | Xiang | H04M 1/725 |

OTHER PUBLICATIONS

Logitech, "Logi ZeroTouch Turns Any Car Into a Hands-Free Connected Car," retrieved from: http://news.logitech.com/press-release/consumer-products/logi-zerotouch-turns-any-car-hands-free-connected-car, May 11, 2016, 2 pp.

Crist, "You can finally pair the Amazon Echo with Bluetooth speakers," retrieved from: https://www.cnet.ccm/news/you-can-finally-connect-the-amazon-echo-with-bluetooth-speakers/, Mar. 13, 2017, 6 pp.

\* cited by examiner

COMPUTATIONAL ASSISTANT EXTENSION DEVICE

BACKGROUND

Some computing platforms may provide a user interface from which a user can converse, speak, or otherwise communicate with a virtual, computational assistant (e.g., also referred to as "an intelligent assistant" or simply as an "assistant") to cause the assistant to output useful information, respond to a user's needs, or otherwise perform certain operations to help the user complete a variety of real-world or virtual tasks. For instance, a computing device may receive, with a microphone or camera, user input (e.g., audio data, image data, etc.) that corresponds to a user utterance or user environment. An assistant executing at least in part at the computing device may analyze a user input and attempt to "assist" a user by outputting useful information based on the user input, responding to the user's needs indicated by the user input, or otherwise perform certain operations to help the user complete a variety of real-world or virtual tasks based on the user input. However, some devices or systems may not provide such a user interface, which may prevent users from utilizing the devices or systems to communicate with computational assistants.

SUMMARY

In general, techniques of this disclosure may enable users to communicate with virtual, computational assistants (e.g., also referred to as "intelligent assistants" or simply as "assistants") using devices or systems that are either not independently capable of enabling, or not configured to enable, user communication with computational assistants. For instance, a user may have a mobile computing device (e.g., a smartphone) that is capable of enabling user communication with computational assistants and a device that is not independently capable of enabling user communication with computational assistants (referred to as the "non-assistant device"). While the mobile computing device may include audio components (e.g., microphones and speakers) that enable user communication with computational assistants, the non-assistant device may include audio components that enable clearer or higher quality user communication with computational assistants. For instance, the non-assistant device may include speakers that are better suited (e.g., louder, closer to the user, being worn by the user, etc.) for user communication with computational assistants.

In accordance with one or more techniques of this disclosure, an assistant extension device may facilitate user communication with a computational assistant executing at the mobile computing device via the non-assistant device. For instance, the assistant extension device may receive, with a microphone, acoustic input (e.g., audio data) that corresponds to a user utterance. The assistant extension device may output the audio data to the mobile computing device via a wireless link. The assistant executing at the mobile computing device may determine and output a response to the utterance to the assistant extension device via the wireless link. The assistant extension device may then output audio data representing the response via speakers of the non-assistant device. In this way, the user may communicate with the computational assistant via the non-assistant device.

In one example, a method includes receiving, by a computational assistant executing at one or more processors of a mobile computing device and via a wireless link between the mobile computing device and an external device, a representation of audio data generated by one or more microphones of the external device, the audio data representing a spoken utterance detected by the external device; determining, by the computational assistant and based on the audio data, a response to the spoken utterance; and sending, by the mobile computing device, to the external device, and via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

In another example, a mobile computing device includes, one or more communication units configured to establish a wireless link between the mobile computing device and an external device; one or more microphones; one or more speakers; and one or more processors. In this example, the one or more processors are configured to execute a computational assistant configured to: receive, via the wireless link between the mobile computing device and the external device, a representation of audio data generated by one or more microphones of the external device, the audio data representing a spoken utterance detected by the external device; determine, based on the received audio data, a response to the spoken utterance; and output, via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

In another example, a computer-readable storage medium stores instructions that, when executed, cause one or more processors of a mobile computing device to: execute a computational assistant configured to: receive, via a wireless link between the mobile computing device and an external device, a representation of audio data generated by one or more microphones of the external device, the audio data representing a spoken utterance detected by the external device; determine, based on the audio data, a response to the spoken utterance; and send, to the external device and via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

In another example, a mobile computing device includes: means for receiving, by a computational assistant executing at the mobile computing device and via a wireless link between the mobile computing device and an external device, a representation of audio data generated by one or more microphones of the external device, the audio data representing a spoken utterance detected by the external device; means for determining, by the computational assistant and based on the audio data, a response to the spoken utterance; and means for sending, to the external device and via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

In another example, a method includes generating, by one or more microphones of a device, audio data representing a spoken utterance detected by the device; outputting, by the device and via a wireless link between the device and an external computing device, a representation of the audio data; receiving, by the device and via the wireless link between the device and the external computing device, a command for the device to output, for playback by one or more speakers connected to the device via a hardwired analog removable connector of the device or a wireless link between the device and the one or more speakers, audio data representing a response to the spoken utterance; and outputting, by the device and via the hardwired removable connector or the wireless link between the device and the one or more speakers, the audio data representing the response to the spoken utterance.

In another example, a device includes one or more communication units configured to establish a wireless link between the device and an external computing device at which a computational assistant is executing; one or more microphones, including at least one far-field microphone; a hardwired analog removable audio connector; one or more processors configured to: receive, from the one or more microphones, audio data representing a spoken utterance detected by the device; output, via the wireless link between the device and the external computing device, a representation of the audio data; receive, via the wireless link between the device and the external computing device, a command for the device to output, for playback by one or more speakers connected to the device via the hardwired analog removable audio connector of the device, audio data representing a response to the spoken utterance; and output, via the hardwired removable audio connector, the audio data representing the response to the spoken utterance.

In another example, a computer-readable storage medium stores instructions that, when executed, cause one or more processors of a device to receive, from one or more microphones of the device, audio data representing a spoken utterance detected by the device; output, via a wireless link between the device and an external computing device, a representation of the audio data; receive, via the wireless link between the device and the external computing device, a command for the device to output, for playback by one or more speakers connected to the device via a hardwired analog removable connector of the device or a wireless link between the device and the one or more speakers, audio data representing a response to the spoken utterance; and output, via the hardwired removable connector or the wireless link between the device and the one or more speakers, the audio data representing the response to the spoken utterance.

In another example, a device includes means for receiving, from one or more microphones of the device, audio data representing a spoken utterance detected by the device; means for outputting, via a wireless link between the device and an external computing device, a representation of the audio data; means for receiving, via the wireless link between the device and the external computing device, a command for the device to output, for playback by one or more speakers connected to the device via a hardwired analog removable connector of the device or a wireless link between the device and the one or more speakers, audio data representing a response to the spoken utterance; and means for outputting, via the hardwired removable connector or the wireless link between the device and the one or more speakers, the audio data representing the response to the spoken utterance.

The details of one or more examples are set forth in the accompanying drawings and the description below. Other features, objects, and advantages of the disclosure will be apparent from the description and drawings, and from the claims.

DETAILED DESCRIPTION

Figure 1:
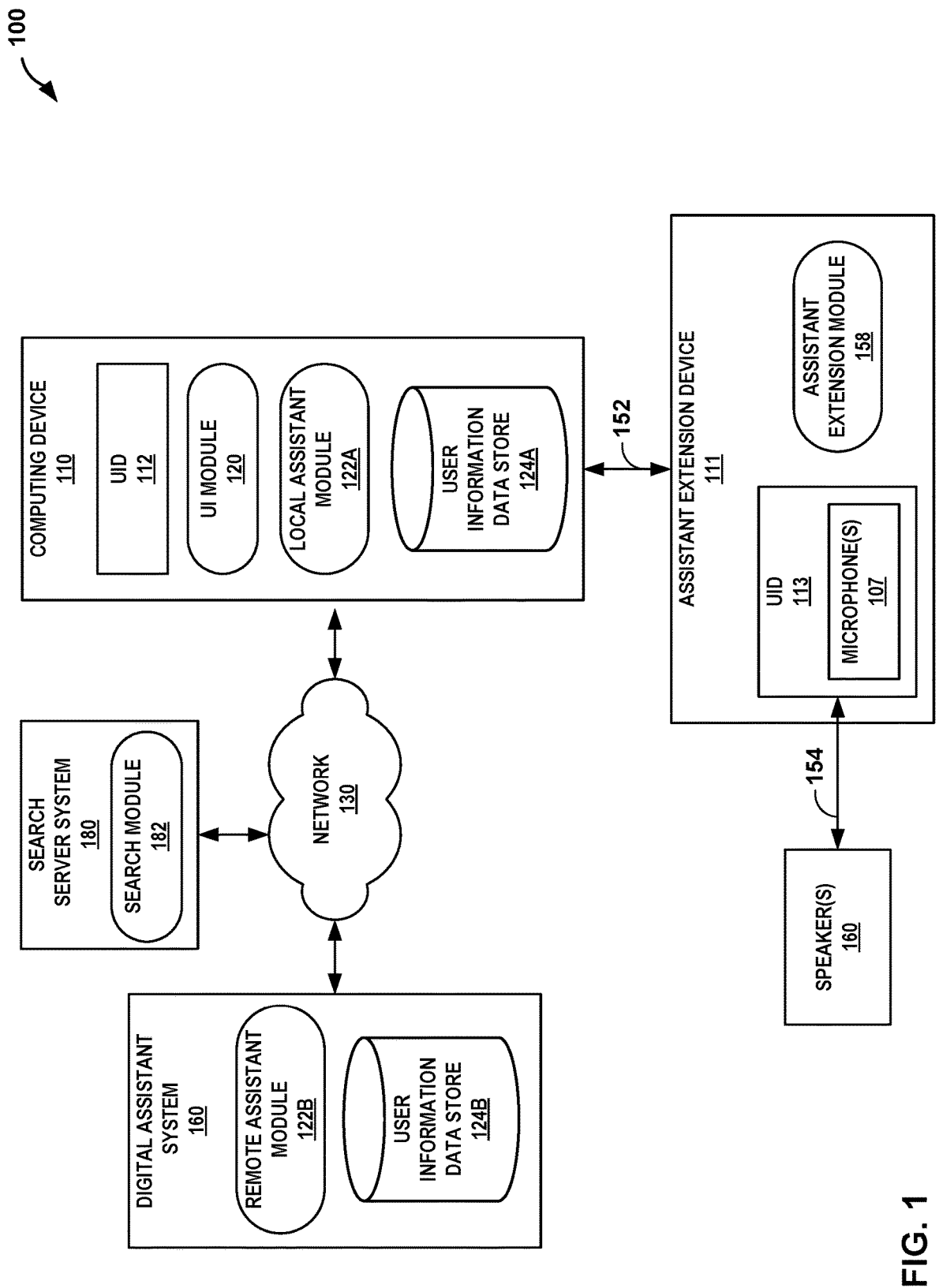
FIG. 1 is a conceptual diagram illustrating an example system that includes a device that enables user communication with an example virtual assistant executing at a different device, in accordance with one or more aspects of the present disclosure.

FIG. 1 is a conceptual diagram illustrating an example system that includes a device that enables user communication with an example virtual assistant executing at a different device, in accordance with one or more aspects of the present disclosure. System 100 of FIG. 1 includes digital assistant system 160 in communication, via network 130, with search server system 180 and computing device 110. Although system 100 is shown as being distributed amongst digital assistant system 160, search server system 180, and computing device 110, in other examples, the features and techniques attributed to system 100 may be performed internally, by local components of computing device 110. Similarly, digital assistant system 160 may include certain components and perform various techniques that are otherwise attributed in the below description to search server system 180 and/or computing device 110.

Network 130 represents any public or private communications network, for instance, cellular, Wi-Fi, and/or other types of networks, for transmitting data between computing systems, servers, and computing devices. In some examples, network 130 may represent all or a portion of the Internet. Digital assistant system 160 may exchange data, via network 130, with computing device 110 to provide a virtual assistant service that is accessible to computing device 110 when computing device 110 is connected to network 130. Digital assistant system 160 may exchange data, via network 130, with search server system 180 to access a search service provided by search server system 180. Computing device 110 may exchange data, via network 130, with search server system 180 to access the search service provided by search server system 180.

Network 130 may include one or more network hubs, network switches, network routers, or any other network equipment, that are operatively inter-coupled thereby providing for the exchange of information between systems 160 and 180 and computing device 110. Computing device 110, digital assistant system 160, and search server system 180 may transmit and receive data across network 130 using any suitable communication techniques. Computing device 110, digital assistant system 160, and search server system 180 may each be operatively coupled to network 130 using respective network links. The links coupling computing device 110, digital assistant system 160, and search server system 180 to network 130 may be Ethernet or other types of network connections and such connections may be wireless and/or wired connections.

Digital assistant system 160 and search server system 180 represent any suitable remote computing systems, such as one or more desktop computers, laptop computers, mainframes, servers, cloud computing systems, etc. capable of sending and receiving information both to and from a network, such as network 130. Digital assistant system 160 hosts (or at least provides access to) a virtual assistant service. Search server system 180 hosts (or at least provides access to) a search service. In some examples, digital assistant system 160 and search server system 180 represent cloud computing systems that provide access to their respective services via a cloud.

Computing device 110 represents one or more individual mobile or non-mobile computing devices. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Digital assistant system 160 and/or search server system 180 may communicate with computing device 110 via network 130 to give computing device 110 access the virtual assistant service provided by digital assistant system 160 and/or to provide computing device 110 access to the search service provided by search server system 180. In the course of providing virtual assistant services, digital assistant system 160 may communicate with search server system 180 via network 130 to obtain search results for providing a user of the virtual assistant service information to complete a task.

In the example of FIG. 1, digital assistant system 160 includes remote assistant module 122B and user information data store 124B. Remote assistant module 122B may maintain user information data store 124B as part of a virtual assistant service that digital assistant system 160 provides via network 130 (e.g., to computing device 110). Computing device 110 includes user interface device (UID) 112, user interface (UI) module 120, local assistant module 122A, and user information data store 124A. Local assistant module 122A may maintain user information data store 124A as part of a virtual assistant service that executes locally at computing device 110. Remote assistant module 122B and local assistant module 122A may be referred to collectively as assistant modules 122A and 122B. Local data store 124A and remote data store 124B may be referred to collectively as data stores 124A and 124B.

Modules 120, 122A, 122B, and 182 may perform operations described using software, hardware, firmware, or a mixture of hardware, software, and firmware residing in and/or executing at one of computing device 110, digital assistant system 160, or search server system 180. Computing device 110, digital assistant system 160, and search server system 180 may execute modules 120, 122A, 122B, and 182 with multiple processors or multiple devices. Computing device 110, digital assistant system 160, and search server system 180 may execute modules 120, 122A, 122B, and 182 as virtual machines executing on underlying hardware. Modules 120, 122A, 122B, and 182 may execute as one or more services of an operating system or computing platform. Modules 120, 122A, 122B, and 182 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or local assistant module 122A processes for completing a task. As another example, UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. UID 112 may function as output device using speaker technologies, haptic feedback technologies, or other output device technology for use in outputting information to a user. UID 112 may present a user interface related to a virtual assistant provided by local assistant module 122A and/or remote assistant module 122B. UID 112 may present a user interface related to other features of computing platforms, operating systems, applications, and/or services executing at and/or accessible from computing device 110 (e.g., e-mail, chat, online services, telephone, gaming, etc.).

UI module 120 may manage user interactions with UID 112 and other components of computing device 110 including interacting with digital assistant system 160 so as to provide assistant services via UID 112. UI module 120 may cause UID 112 to output a user interface as a user of computing device 110 views output and/or provides input at UID 112. UI module 120 and UID 112 may receive one or more indications of input (e.g., voice input, gesture input, etc.) from a user as the user interacts with the user interface, at different times and when the user and computing device 110 are at different locations. UI module 120 and UID 112 may interpret inputs detected at UID 112 and may relay information about the inputs detected at UID 112 to local assistant module 122A and/or one or more other associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as systems 160 and 180. In addition, UI module 120 may act as an intermediary between the one or more associated platforms, operating systems, applications, and/or services executing at computing device 110, and various output devices of computing device 110 (e.g., speakers, LED indicators, audio or haptic output device, etc.) to produce output (e.g., a graphic, a flash of light, a sound, a haptic response, etc.) with computing device 110.

Search module 182 may execute a search for information determined to be relevant to a search query that search module 182 automatically generates (e.g., based on contextual information associated with computing device 110) or that search module 182 receives from digital assistant system 160 or computing device 110 (e.g., as part of a task that a virtual assistant is completing on behalf of a user of computing device 110). Search module 182 may conduct an Internet search based on a search query to identify information (e.g., weather or traffic conditions, news, stock prices, sports scores, user schedules, transportation schedules, retail prices, etc.) related to the search query from amongst from a variety of information sources (e.g., either stored locally or remote to search server system 180). After executing a search, search module 182 may output the information returned from the search (e.g., the search results) to digital assistant system 160 or computing device 110.

Local assistant module 122A of computing device 110 and remote assistant module 122B of digital assistant system 160 may each perform similar functions described herein for automatically executing an assistant that is configured to perform a variety of tasks for a user. Remote assistant module 122B and user information data store 124B represent server-side or cloud implementations of an example virtual assistant whereas local assistant module 122A and user information data store 124A represent a client-side or local implementation of the example virtual assistant.

Modules 122A and 122B (collectively, "assistant modules 122") may each include respective software agents configured to execute as intelligent personal assistants that can perform tasks or services for an individual, such as a user of computing device 110. Assistant modules 122 may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing device 110, digital assistant system 160, or obtained via the search service provided by search server system 180). The assistant provided by assistant modules 122 may be considered a general purpose assistant in that the assistant is capable of a wide variety of tasks. Assistant modules 122 may perform artificial intelligence and/or machine learning techniques to automatically identify and complete one or more tasks on behalf of a user.

The respective assistant provided by assistant modules 122 may be configured to perform one or more tasks in the course of executing operations to satisfy verbal or spoken requests of users of computing device 110. For instance, the assistant provided by assistant modules 122 (e.g., an assistant executing at least in part at computing device 110) may receive, with one or more microphones of computing device 110, acoustic input (e.g., audio data) that corresponds to an utterance a user of computing device 110 requesting performance of a particular task (e.g., "Order me a large pepperoni pizza from Pizza Place for delivery home").

The assistant provided by assistant modules 122 may analyze the audio data to identify a task that corresponds to the spoken utterance. For instance, the assistant provided by assistant modules 122 may utilize speech recognition to determine that the spoken utterance of "Order me a large pepperoni pizza from Pizza Place for delivery home" corresponds to a place order task with the parameters of item: large pepperoni pizza, source: Pizza Place, destination: user's home address.

In some examples, the assistant provided by assistant modules 122 may receive and/or analyze the audio data that corresponds to the utterance based on a trigger phrase (e.g., "OK Computer," "Hey Device," etc.) being recognized by computing device 110 from audio data generated by the one or more microphones of computing device 110. As such, in some examples, the assistant provided by assistant modules 122 may refrain from receiving and/or analyzing the audio data that corresponds to the utterance unless a trigger phrase is recognized. In other words, if the assistant provided by assistant modules 122 determines that the user said "Hey Device" prior to saying "Order me a large pepperoni pizza from Pizza Place for delivery home," the assistant provided by assistant modules 122 may proceed to analyze the audio data. Similarly, if the assistant provided by assistant modules 122 does not determines that the user said "Hey Device" (or another trigger phrase or some other activation action, such as pushing a button) prior to saying "Order me a large pepperoni pizza from Pizza Place for delivery home," the assistant provided by assistant modules 122 may disregard and delete the audio data.

The assistant provided by assistant modules 122 may perform the identified task. For instance, to continue with the place order example, the assistant provided by assistant modules 122 may look-up the user's home address and contact information for Pizza Place. The assistant provided by assistant modules 122 may contact Pizza Place (e.g., either place a call to Pizza Place or connect to a computing system associated with Pizza Place) and place an order for a large pepperoni pizza to be delivered to the user's home address.

The assistant provided by assistant modules 122 may output an audio response to the utterance. For instance, after placing the order for the large pepperoni pizza to be delivered to the user's home address, the assistant provided by assistant modules 122 may output synthesized voice data for output by one or more speakers of computing device 110 indicating that the order has been placed and providing an expected delivery time (e.g., "Pizza Place will be delivering your large pepperoni pizza to your house around 7:00 pm").

As discussed above, users may interact with the assistant provided by assistant modules 122 via microphones and speakers of computing device 110. For instance, where computing device 110 is a smartphone, users may interact with an assistant provided by assistant modules 122 via any combination of microphones and speakers integrated in the smartphone, microphones and speakers plugged into the smartphone (e.g., wired headsets or speakers plugged into an auxiliary port of computing device 110), and/or microphones and speakers wirelessly connected to the smartphone (e.g., Bluetooth headsets or speakers paired with computing device 110).

In some situations, it may be desirable for users to interact with the assistant provided by assistant modules 122 via microphones and speakers other than the microphones and speakers of computing device 110. For instance, it may be desirable for users to interact with the assistant provided by assistant modules 122 via microphones and/or speakers of a non-assistant device to enable clearer or higher quality user communication with the assistant. For instance, the non-assistant device may include speakers that are better suited (e.g., louder, closer to the user, being worn by the user, etc.) for user communication with computational assistants. As one example, where computing device 110 is in a user's pocket or bag, the microphones of computing device 110 may not well suited to detect the user's voice. As another example, where a user has a sound system, speakers of the sound system may be more well suited to output higher quality audio to the user.

In accordance with one or more techniques of this disclosure, system 100 may include assistant extension device 111, which may facilitate user communication with the assistant provided by assistant modules 122 via one or more non-assistant devices. For instance, assistant extension device 111 may facilitate user communication with the assistant provided by assistant modules 122 via speakers 160 and/or microphones 107. Examples of assistant extension device 111 include dongles, pucks, pendants, or any other type of mobile, non-mobile, wearable, and non-wearable computing device configured to facilitate user communication with virtual computational assistants executing at other devices. As shown in FIG. 1, assistant extension device 111 may be connected to computing device 110 via wireless link 152 and may include UID 113 and assistant extension module 158.

Wireless link 152 may enable the transfer of data or other information between assistant extension device 111 and computing device 110. Wireless link 152 may operate using any standard or non-standard wireless protocol. For instance, wireless link 152 may operate using Bluetooth, Wi-Fi, or any other wireless protocol. Wireless link 152 may be established during an initial pairing or configuration of assistant extension device 111. Wireless link 152 may be persistent (e.g., always active) or intermittent (e.g., not always active).

UID 113 of assistant extension device 111 may function as an input and/or output device for assistant extension device 111. UID 113 may be implemented using various technologies. For instance, UID 113 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 113 may function as an input device using microphone technologies, infrared sensor technologies, or other input device technology for use in receiving user input. For example, UID 113 may detect, using built-in microphones 107, voice input that assistant extension module 158 may process and/or forward to computing device 110. As another example, UID 113 may include a presence-sensitive display that may receive tactile input from a user of computing device 110 and assistant extension device 111. UID 113 may receive indications of tactile input by detecting one or more gestures from a user (e.g., the user touching or pointing to one or more locations of UID 113 with a finger or a stylus pen).

UID 113 may function as output (e.g., display) device and present output to a user. UID 113 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110 and assistant extension device 111. UID 113 may function as output device using speaker technologies, haptic feedback technologies, or other output device technology for use in outputting information to a user. For instance, UID 113 may output, for playback via speakers 160, audio data received from computing device 110. UID 113 may present a user interface related to a virtual assistant provided by local assistant module 122A and/or remote assistant module 122B. UID 113 may present a user interface related to other features of computing platforms, operating systems, applications, and/or services executing at and/or accessible from computing device 110 (e.g., e-mail, chat, online services, telephone, gaming, etc.).

UID 113 may be connected to one or more non-assistant devices via link 154. As one example and as illustrated in FIG. 1, UID 113 may be connected to speakers 160 via link 154. As another example, UID 113 may be connected to one or more external microphones via link 154. As another example, UID 113 may be connected to speakers 160 and one or more external microphones via a single link 154 or multiple links 154. In some examples, link 154 may be a wired link. For instance, link 154 may represent a wire or cable that connects one or more non-assistant devices to a hardwired analog removable connector of assistant extension device 111. Examples of the hardwired analog removable connector include, but are not necessarily limited to, 2.5 millimeter audio jacks, 3.5 millimeter or $\frac{1}{8}^{th}$ inch audio jacks (e.g., an AUX port or headphone jack), and 6.35 millimeter or $\frac{1}{4}^{th}$ inch audio jacks.

UID 113 may include one or more microphones 107. In some examples, microphones 107 may include one or more near-field microphones configured to detect speech from users relatively close (e.g., within five meters) to assistant extension device 107. In some examples, microphones 107 may include one or more far-field microphones configured to detect speech from users relatively far (e.g., greater than five meters) from assistant extension device 107. In some examples, microphones 107 may include one or more near-field microphones and one or more far-field microphones.

Assistant extension module 158 may enable users to communicate with the assistant provided by assistant modules 122 via one or more non-assistant devices. As one example, to enable a user to speak with the assistant provided by assistant modules 122, assistant extension module 158 may receive audio data with microphones 107 (or one or more microphones connected to assistant extension device 111 via link 154), and transmit the received audio data to computing device 110 via link 152. As another example, to enable the assistant provided by assistant modules 122 to reply, respond, or otherwise output audio data to the user, assistant extension module 158 may receive audio data from computing device 110 via link 152, and output the received audio data for playback by speakers 160 (or one or more speakers integrated in assistant extension device 111).

Speakers 160 represent one or more devices capable of outputting audible acoustic signals. Examples of speakers 160 include, but are not necessarily limited to, headphones (wired and/or wireless), Bluetooth speakers, speakers, sound bars, AV dongles (e.g., dongles connected to HDMI ports of televisions or stereo receivers), stereo receivers, car stereos, and any other audio output component that is not independently capable of enabling user communication with computational assistants (referred to as "non-assistant devices").

In operation, assistant extension module 158 may receive, with one or more microphones of assistant extension device 111 (e.g., microphones 107 and/or one or more microphones connected to assistant extension device 111 via link 154), acoustic input (e.g., audio data) that corresponds to an utterance a user of computing device 110 and assistant extension device 111 requesting performance of a particular task (e.g., "Order me a large pepperoni pizza from Pizza Place for delivery home").

Assistant extension module 158 may output, via wireless link 152, a representation of the acoustic input. The representation of the acoustic input may be uncompressed, compressed, encoded, truncated, or any other processed or unprocessed version of the audio data.

The assistant provided by assistant modules 122 may receive and analyze the representation of the audio data to identify a response to the spoken utterance. Example responses include, but are not limited to, answering a question included in the spoken utterance, confirming performance of a task included in the spoken utterance, and/or asking a question to clarify the spoken utterance. For instance, as described in the example above where the spoken utterance is "Order me a large pepperoni pizza from Pizza Place for delivery home," the assistant provided by assistant modules 122 may place the order and identify the response as a confirmation that the order has been placed.

The assistant provided by assistant modules 122 may transmit/send or otherwise output audio data representing the identified response to assistant extension device 111. For instance, the assistant provided by assistant modules 122 may send, via wireless link 152, a command to output, for playback by one or more speakers of assistant extension device 111 (e.g., speakers 160 or one or more speakers included in assistant extension device 111), synthesized voice data indicating that the order has been placed and providing an expected delivery time (e.g., "Pizza Place will be delivering your large pepperoni pizza to your house around 7:00 pm").

In this way, assistant extension device 111 enables users to communicate with virtual computational assistants via non-assistant devices. As one example, where speakers 160 are included in a sound system (e.g., a home theater or headphones) that does not include a microphone, assistant extension device 111 may enable users to communicate with virtual computational assistants via the sound system by receiving user utterances via microphones 107 and outputting audible responses via speakers 160 of the sound system. As another example, where speakers 160 are included in a sound system that does include one or more microphones, assistant extension device 111 may enable users to communicate with virtual computational assistants via the sound system by receiving user utterances via the microphones of the sound system and outputting audible responses via speakers 160 of the sound system.

As discussed above, assistant extension device 111 may enable users to communicate with a virtual computational assistant executing at a computing device via non-assistant devices. For instance, assistant extension device 111 may enable users to communicate with the assistant provided by assistant modules 122. The assistant provided by assistant modules 122 may be considered to be executing at computing device 110 in that one or more processors of computing device 110 may process utterances provided by users, determine responses to utterances provided by users, and other such operations. The assistant provided by assistant modules 122 may be considered to be not be executing at assistant extension device 111 in that one or more processors of assistant extension device 111 may not process utterances provided by users, not determine responses to utterances provided by users, and not perform other such operations.

As discussed above, in some examples, the assistant provided by assistant modules 122 may receive and/or analyze the audio data that corresponds to the utterance based on a trigger phrase (e.g., "OK Computer," "Hey Device," etc.) being recognized by computing device 110 and/or some other activation action. In some examples, such as where assistant extension device 111 outputs the audio data to computing device 110, assistant extension device 111 may selectively output the audio data to computing device 110 based on the detection of an activation action. As one example, assistant extension module 158 may monitor audio data generated by microphones 107 (or one or more microphones connected via link 154) and determine that an activation action has occurred when assistant extension module 158 recognized a trigger phrase from the audio data. As another example, assistant extension module 158 may determine that an activation action as occurred when a button or switch on assistant extension device 111 is activated (e.g., pushed or flipped).

Responsive to determining that an activation action has occurred, assistant extension device 111 may selectively output the audio data to computing device 110. For instance, responsive to determining that a user spoke a trigger phrase at a particular point in time, assistant extension device 111 may output audio data captured after the particular point in time to computing device 110 (e.g., until the user has finished speaking and/or a particular period of time has passed). Similarly, where an activation action has not occurred, assistant extension device 111 may refrain from outputting the audio data to computing device 110. By locally determining whether an activation action has occurred, assistant extension device 111 may avoid having to continually output audio data to computing device 110, which may reduce the power consumption of assistant extension device.

The respective assistant provided by remote assistant module 122B and local assistant module 122A may, in the course of executing operations to support conversations with a user of computing device 110, automatically create, generate, or otherwise maintain personal records of information obtained during the conversations and store the personal records as values that are specific to the user, in a structured and semantic fashion as user information data store 124B and user information data store 124A, respectively. Data stores 124B and 124A may enable, respectively, the respective assistant executed by remote assistant module 122B and local assistant module 122A to quickly access the personal information (e.g., the values that are specific to the user) to complete a real-world task, a virtual task, or otherwise respond to immediate or future need of the user of computing device 110. For ease of description, the techniques of this disclosure are described primarily from the perspective of being performed by local assistant module 122A.

Assistant modules 122A and 122B may maintain user information data stores 124A and 124B as part of a virtual assistant service that assistant modules 122A and 122B together, or separately, provide to computing device 110. The assistant(s) provided by assistant modules 122 may, in the course of executing operations to support a conversation with users of computing device 110, maintain personal records of the information being automatically culled from the conversations and store the personal records in a structured and semantic fashion as user information data store 124A and 124B. Data stores 124A and 124B may enable the assistant executed by assistant modules 122A and 122B to quickly access the personal information to complete a real-world task, a virtual task, or otherwise respond to immediate and/or future needs of the user of computing device 110.

Assistant modules 122A and 122B may only retain personal records associated with a user of computing device 110 after first receiving explicit permission from the user to do-so. Thus, the user may have complete control over how the assistant collects and uses information about the user, including the permission settings and automation action usage history. For example, prior to retaining information associated with the users of computing device 110, assistant modules 122A and 122B may cause UI module 120 to present a user interface via UID 112 that requests users to select a box, click a button, state a voice input, or otherwise provide a specific input to the user interface that is interpreted by assistant modules 122A and 122B as unambiguous, affirmative consent for assistant modules 122A and 122B to collect and make use of the user's personal information.

Assistant modules 122A and 122B may encrypt or otherwise treat the information being maintained as personal records to remove the actual identity of the user before storing the personal information at data stores 124A and 124B. For example, the information may be treated by assistant modules 122A and 122B so that any personally-identifiable information is removed from the personal records of the user when stored at data stores 124A and 124B.

Assistant modules 122A and 122B may cause UI module 120 to present a user interface via UID 112 from which the user of computing device 110, may modify or remove information from the personal records stored at data stores 124A and 124B. For example, the user interface may provide areas at which the user of computing device 110 can provide input to communicate to assistant modules 122A and 122B a command to modify or remove specific pieces of personal information. In this way, the user of computing device 110 may have complete control over the information being retained by assistant modules 122A and 122B at data stores 124A and 124B.

Each entry in the personal records stored by data stores 124A and 124B may be associated with a predefined schema that can be quickly traversed or parsed by assistant modules 122A and 122B to find the information assistant modules 122A and 122B need at a current time for understanding user needs and for helping the user to complete a task. Once personal information has been recorded as one or more values that are specific to a user, assistant modules 122A and 122B can quickly use information stored at data stores 124A and 124B to complete a task. If there is no ongoing task, assistant modules 122A and 122B may provide the user with examples of how the assistant may use the information to help the user in the future. The user may later provide input at UID 112 to command assistant modules 122A and 122B to forget or modify this information.

The values stored by data stores 124A and 124B may be textual values (e.g., names of persons, names of places, other textual descriptors of entities), numerical values (e.g., age, height, weight, other physiological data, other numerical information associated with entities), or pointers to values specific to a user (e.g., a location in memory to an entity in a knowledge graph of a user, a location in memory to a contact in an address book, etc.). In other words, a value specific to a user may take many forms and be specific to a field of a personal record that is defined by the recording schema. The value may indicate the actual information that is specific to the user or may be a reference to a location from which the information specific to the user can be retrieved.

By having access to data stores 124A and 124B, the assistant provided by assistant modules 122 may be considered to be personalized to the user. For instance, the assistant provided by assistant modules 122 may be able to perform tasks using information specific to the requesting user that is not generally available to other users.

Figure 2:
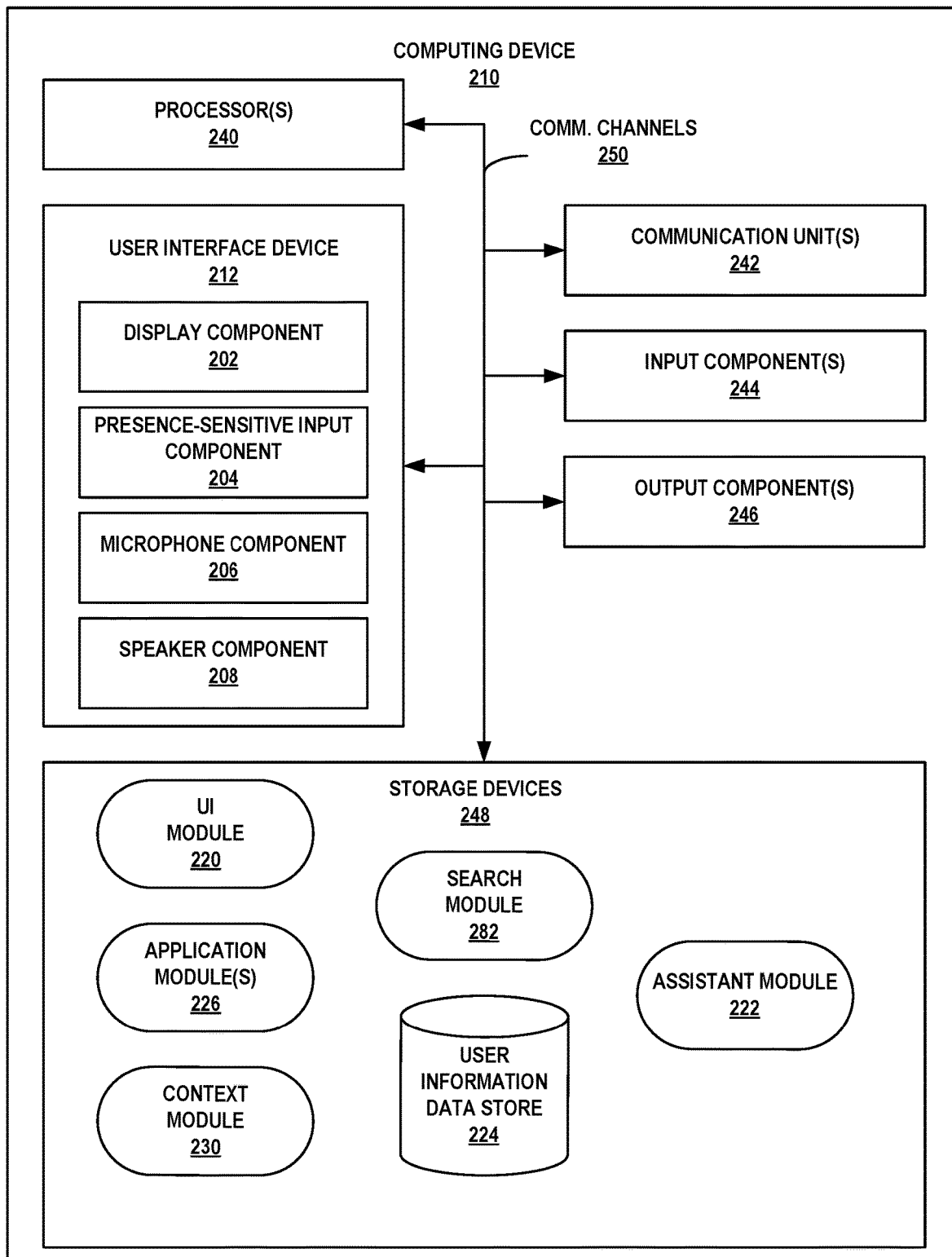
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (UID) 212, one or more processors 240, one or more communication units 242, one or more input components 244, one or more output components 246, and one or more storage components 248. UID 212 includes display component 202, presence-sensitive input component 204, microphone component 206, and speaker component 208. Storage components 248 of computing device 210 include UI module 220, assistant module 222, search module 282, one or more application modules 226, context module 230, user information data store 224, user identification module 232, action identification module 234, and authorization module 236.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., digital assistant system 160 and/or search server system 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 110 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202, presence-sensitive input component 204, microphone component 206, and speaker component 208. Display component 202 may be a screen at which information is displayed by UID 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, UID 212 may present a user interface (such as a graphical user interface).

Speaker component 208 may comprise a speaker built-in to a housing of computing device 210 and in some examples, may be a speaker built-in to a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal. Microphone component 206 may be a near-field microphone that is better suited for detecting audible input provided close to computing device 210 than audible input provided farther away from computing device 210.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 226, 230, and 282 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, 230, and 282. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 226, 230, and 282 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 226, 230, and 282 and data store 224. Storage components 248 may include a memory configured to store data or other information associated with modules 220, 222, 226, 230, and 282 and data store 224.

UI module 220 may include all functionality of UI module 120 of computing device 110 of FIG. 1 and may perform similar operations as UI module 120 for managing a user interface that computing device 210 provides at UID 212 for example, for facilitating interactions between a user of computing device 110 and assistant module 222. For example, UI module 220 of computing device 210 may receive information from assistant module 222 that includes instructions for outputting (e.g., displaying or playing audio) an assistant user interface. UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220. UI module 220 may send an indication of the voice input to assistant module 222 for further interpretation. Assistant module 222 may determine, based on the voice input, that the detected voice input represents a user request for assistant module 222 to perform one or more tasks.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Search module 282 of computing device 210 may perform integrated search functions on behalf of computing device 210. Search module 282 may be invoked by UI module 220, one or more of application modules 226, and/or assistant module 222 to perform search operations on their behalf. When invoked, search module 282 may perform search functions, such as generating search queries and executing searches based on generated search queries across various local and remote information sources. Search module 282 may provide results of executed searches to the invoking component or module. That is, search module 282 may output search results to UI module 220, assistant module 222, and/or application modules 226 in response to an invoking command.

Context module 230 may collect contextual information associated with computing device 210 to define a context of computing device 210. Specifically, context module 230 is primarily used by assistant module 222 to define a context of computing device 210 that specifies the characteristics of the physical and/or virtual environment of computing device 210 and a user of computing device 210 at a particular time.

As used throughout the disclosure, the term "contextual information" is used to describe any information that can be used by context module 230 to define the virtual and/or physical environmental characteristics that a computing device, and the user of the computing device, may experience at a particular time. Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210. For example, context module 230 may receive, via a radio or communication unit of computing device 210, beacon information transmitted from external beacons located at or near a physical location of a merchant.

Assistant module 222 may include all functionality of local assistant module 122A of computing device 110 of FIG. 1 and may perform similar operations as local assistant module 122A for providing an assistant. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to remote assistant module 122B of digital assistant system 160 of FIG. 1. Assistant module 222 may rely on the information stored at data store 224, in addition to any information provided by context module 230 and/or search module 282, to perform assistant tasks.

The assistant provided by assistant modules 222 may be configured to perform one or more tasks in the course of executing operations to satisfy verbal or spoken requests of users of computing device 210. For instance, the assistant provided by assistant module 222 may receive, with one or more microphones of computing device 210, acoustic input (e.g., audio data) that corresponds to an utterance a user of computing device 210 requesting performance of a particular task. The assistant provided by assistant module 222 may analyze the audio data to identify a task that corresponds to the spoken utterance.

In accordance with one or more techniques of this disclosure, the assistant provided by assistant module 222 may interact with a user via microphones and/or speakers of a device other than computing device 210. For instance, computing device 210 may be connected to an assistant extension device (e.g., assistant extension device 111 of FIG. 1), via a wireless link. One or more of communication units 242 may receive, via the wireless link, audio data corresponding to a spoken utterance that was detected by microphones of the assistant extension device. Assistant module 222 may, alone or in tandem with a remote assistant module, process the audio data to determine a response to the spoken utterance. Assistant module 222 may cause one or more of communication units 242 to output, via the wireless link, the response to the utterance. For instance, assistant module 222 may cause one or more of communication units 242 to output, via the wireless link, a command for the assistant extension device to output, for playback by one or more speakers connected to the assistant extension device via a hardwired analog removable connector of the assistant extension device or a wireless link between the assistant extension device and the one or more speakers, audio data representing the response to the spoken utterance.

Figure 3:
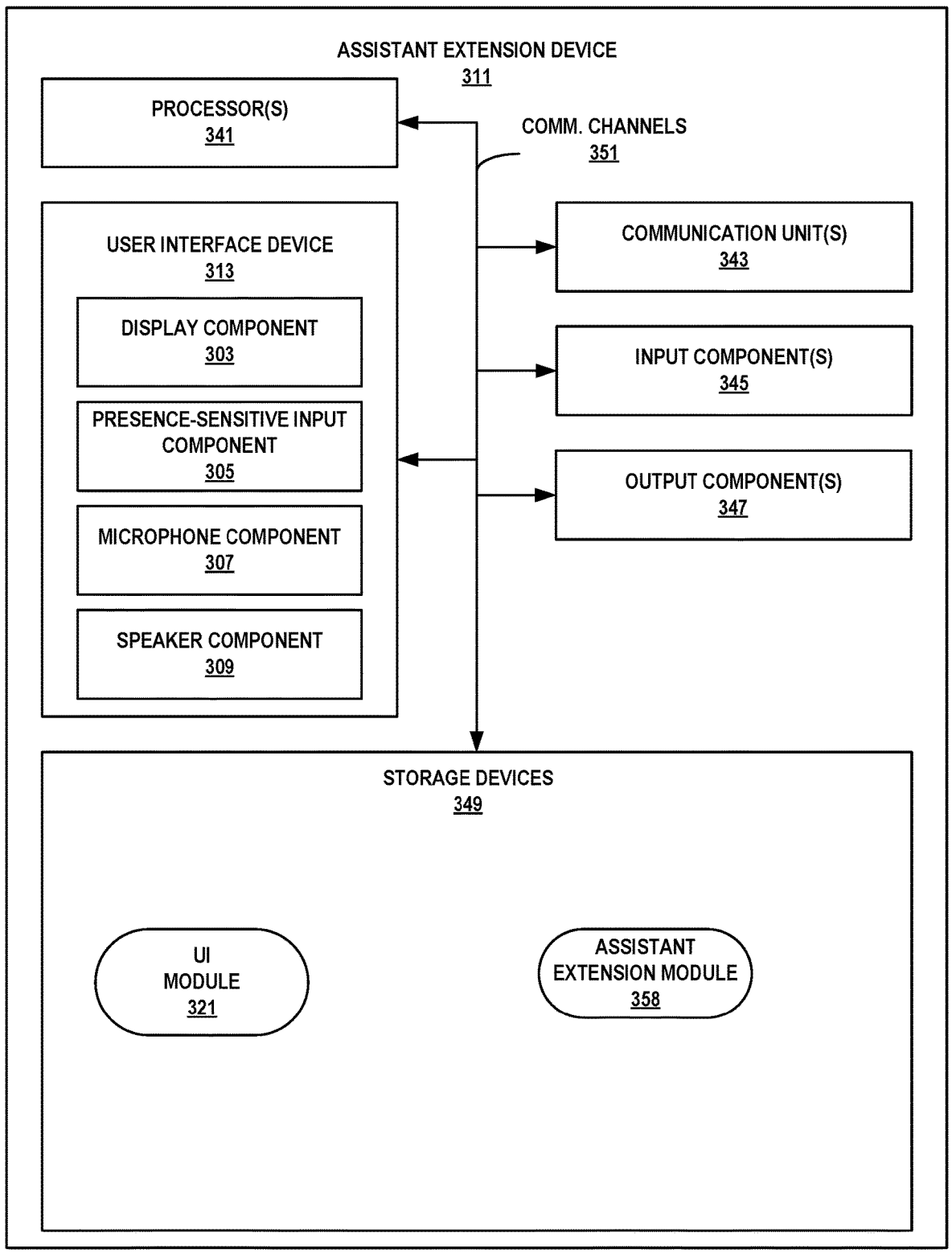
FIG. 3 is a block diagram illustrating an example assistant extension device that enables user communication with an example virtual assistant executing at a different device, in accordance with one or more aspects of the present disclosure.

FIG. 3 is a block diagram illustrating an example assistant extension device that is configured to enable user interactions with an example virtual assistant executing on another device, in accordance with one or more aspects of the present disclosure. Assistant extension device 311 of FIG. 3 is described below as an example of assistant extension device 111 of FIG. 1. FIG. 3 illustrates only one particular example of assistant extension device 311, and many other examples of assistant extension device 311 may be used in other instances and may include a subset of the components included in example assistant extension device 311 or may include additional components not shown in FIG. 3. For instance, assistant extension device 311 may include a battery configured to supply power to one or more components of assistant extension device 311.

As shown in the example of FIG. 3, assistant extension device 311 includes user interface device (UID) 313, one or more processors 341, one or more communication units 343, one or more input components 345, one or more output components 347, and one or more storage components 349. UID 313 may include display component 303, presence-sensitive input component 305, microphone component 307, and speaker component 309. Storage components 349 may include UI module 321, and assistant extension module 358.

Communication channels 351 may interconnect each of the components 313, 341, 343, 345, 347, and 349 for inter-component communications (physically, communicatively, and/or operatively). In some examples, communication channels 351 may include a system bus, a network connection, an inter-process communication data structure, or any other method for communicating data.

One or more communication units 343 of assistant extension device 311 may communicate with external devices (e.g., computing device 110 and/or speakers 160 of FIG. 1) via one or more wired and/or wireless networks by transmitting and/or receiving network signals on one or more networks (e.g., network 130 of system 100 of FIG. 1). However, in some examples, communication units 343 may not provide assistant extension device 311 with a connection to the same networks as computing device 110. For instance, computing device 110 may have an Internet connection where assistant extension device 311 may not have an Internet connection. Similarly, computing device 110 may be able to communicate with digital assistant system 160 and search server system 180 of FIG. 1 where assistant extension device 311 may not be able to communicate with digital assistant system 160 and search server system 180 of FIG. 1 (except via computing device 110). Examples of communication units 343 include a network interface card (e.g. such as an Ethernet card), an optical transceiver, a radio frequency transceiver, a GPS receiver, or any other type of device that can send and/or receive information. Other examples of communication units 343 may include short wave radios, cellular data radios, wireless network radios, as well as universal serial bus (USB) controllers.

One or more input components 345 of assistant extension device 311 may receive input. Examples of input are tactile, audio, and video input. Input components 345 of assistant extension device 311, in one example, includes a presence-sensitive input device (e.g., a touch sensitive screen, a PSD), mouse, keyboard, voice responsive system, camera, microphone or any other type of device for detecting input from a human or machine. In some examples, input components 345 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 347 of assistant extension device 311 may generate output. Examples of output are tactile, audio, and video output. Output components 347 of assistant extension device 311, in one example, includes a presence-sensitive display, sound card, video graphics adapter card, speaker, cathode ray tube (CRT) monitor, liquid crystal display (LCD), or any other type of device for generating output to a human or machine.

UID 313 of computing device 210 may be similar to UID 113 of assistant extension device 111 of FIG. 1 and may include display component 303, presence-sensitive input component 305, microphone component 307, and speaker component 309. Display component 303 may be a screen at which information is displayed by UID 313 while presence-sensitive input component 305 may detect an object at and/or near display component 303. Speaker component 309 may be a speaker from which audible information is played by UID 313 while microphone component 307 may detect audible input provided at and/or near display component 303 and/or speaker component 309.

While illustrated as an internal component of assistant extension device 311, UID 313 may also represent an external component that shares a data path with assistant extension device 111 for transmitting and/or receiving input and output. For instance, in one example, UID 313 represents a built-in component of assistant extension device 311 located within and physically connected to the external packaging of assistant extension device 311 (e.g., a screen on a countertop device). In another example, UID 313 represents an external component of assistant extension device 311 located outside and physically separated from the packaging or housing of assistant extension device 311 (e.g., a monitor, a projector, etc. that shares a wired and/or wireless data path with assistant extension device 311).

As one example range, presence-sensitive input component 305 may detect an object, such as a finger or stylus that is within two inches or less of display component 303. Presence-sensitive input component 305 may determine a location (e.g., an [x, y] coordinate) of display component 303 at which the object was detected. In another example range, presence-sensitive input component 305 may detect an object six inches or less from display component 303 and other ranges are also possible. Presence-sensitive input component 305 may determine the location of display component 303 selected by a user's finger using capacitive, inductive, and/or optical recognition techniques. In some examples, presence-sensitive input component 305 also provides output to a user using tactile, audio, or video stimuli as described with respect to display component 303. In the example of FIG. 3, UID 313 may present a user interface (such as a graphical user interface).

Speaker component 309 may comprise a speaker built-in to a housing of assistant extension device 311 and in some examples, may be a speaker built-in to a set of wired or wireless headphones that are operably coupled to assistant extension device 311 (e.g., via link 154 of FIG. 1). Microphone component 307 may detect audible input occurring at or near UID 313. Microphone component 307 may comprise a microphone built-in to a housing of assistant extension device 311 and in some examples, may be a microphone built-in to a set of wired or wireless headphones that are operably coupled to assistant extension device 311 (e.g., via link 154 of FIG. 1). Microphone component 307 may perform various noise cancellation techniques to remove background noise and isolate user speech from a detected audio signal. Microphone component 307 may include a far-field microphone that is better suited for detecting audible input provided farther to assistant extension device 311 than audible input provided closer to assistant extension device 311.

UID 313 of assistant extension device 311 may detect two-dimensional and/or three-dimensional gestures as input from a user of assistant extension device 311. For instance, a sensor of UID 313 may detect a user's movement (e.g., moving a hand, an arm, a pen, a stylus, etc.) within a threshold distance of the sensor of UID 313. UID 313 may determine a two or three-dimensional vector representation of the movement and correlate the vector representation to a gesture input (e.g., a hand-wave, a pinch, a clap, a pen stroke, etc.) that has multiple dimensions. In other words, UID 313 can detect a multi-dimension gesture without requiring the user to gesture at or near a screen or surface at which UID 313 outputs information for display. Instead, UID 313 can detect a multi-dimensional gesture performed at or near a sensor which may or may not be located near the screen or surface at which UID 313 outputs information for display.

One or more processors 341 may implement functionality and/or execute instructions associated with assistant extension device 311. Examples of processors 341 include application processors, display controllers, auxiliary processors, one or more sensor hubs, and any other hardware configure to function as a processor, a processing unit, or a processing device. Modules 321 and 358 may be operable by processors 341 to perform various actions, operations, or functions of assistant extension device 311. For example, processors 341 of assistant extension device 311 may retrieve and execute instructions stored by storage components 349 that cause processors 341 to perform the operations of modules 321 and 358. The instructions, when executed by processors 341, may cause assistant extension device 311 to store information within storage components 349.

One or more storage components 349 within assistant extension device 311 may store information for processing during operation of assistant extension device 311 (e.g., assistant extension device 311 may store data accessed by modules 321 and 358 during execution at assistant extension device 311). In some examples, storage component 349 is a temporary memory, meaning that a primary purpose of storage component 349 is not long-term storage. Storage components 349 on assistant extension device 311 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 349, in some examples, also include one or more computer-readable storage media. Storage components 349 in some examples include one or more non-transitory computer-readable storage mediums. Storage components 349 may be configured to store larger amounts of information than typically stored by volatile memory. Storage components 349 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 349 may store program instructions and/or information (e.g., data) associated with modules 321 and 358. Storage components 349 may include a memory configured to store data or other information associated with modules 321 and 358.

UI module 321 may include all functionality of UI module 120 of computing device 110 of FIG. 1 and may perform similar operations as UI module 120 for managing a user interface that assistant extension device 311 provides at UID 313 for example, for facilitating interactions between a user of computing device (e.g., computing device 110 of FIG. 1) and assistant extension device 311, and a virtual computational assistant executing at least in part at the computing device.

Assistant extension module 358 may include all functionality of assistant extension 158 of assistant extension device 111 of FIG. 1 and may perform similar operations as assistant extension 158 for enabling users to interact with virtual computational assistants executing at other devices. For instance, assistant extension module 358 may execute locally (e.g., at processors 341) to enable a user to interact with an assistant provided by assistant module 122 of computing device 110 of FIG. 1.

In operation, to enable a user to speak to an assistant executing at another device (e.g., the assistant provided by assistant module 122A of computing device 110 of FIG. 1), assistant extension module 358 may receive audio data representing spoken utterances from microphone component 307 and cause one or more of communication units 343 to output, via a wireless link, a representation of the received audio data to a computing device at-which an assistant is executing (e.g., computing device 110 of FIG. 1). To enable the assistant executing at the other device to respond to the user, one or more of communication units 343 may receive, via a wireless link and from the computing device at-which the assistant is executing, a representation of audio data representing a response to the spoken utterance. Assistant extension module 358 may cause speaker component 309 to output the audio data representing the response to the spoken utterance.

As discussed above, examples of assistant extension device 311 include dongles, pucks, pendants, or any other type of mobile, non-mobile, wearable, and non-wearable computing device configured to facilitate user communication with virtual computational assistants executing at other devices. As one example, assistant extension device 311 may be a pendent which may be worn by a user (e.g., on a shirt or other piece of attire). As another example, assistant extension device 311 may be a puck which may be placed on a media stand and connected to a sound bar or other audio output system. As another example, assistant extension device 311 may be a configured for mounting in a vehicle and connected to a sound system of the vehicle (e.g., mounted to a dashboard or cup holder and connected to the sound system via an AUX port or a Bluetooth link).

Figure 4:
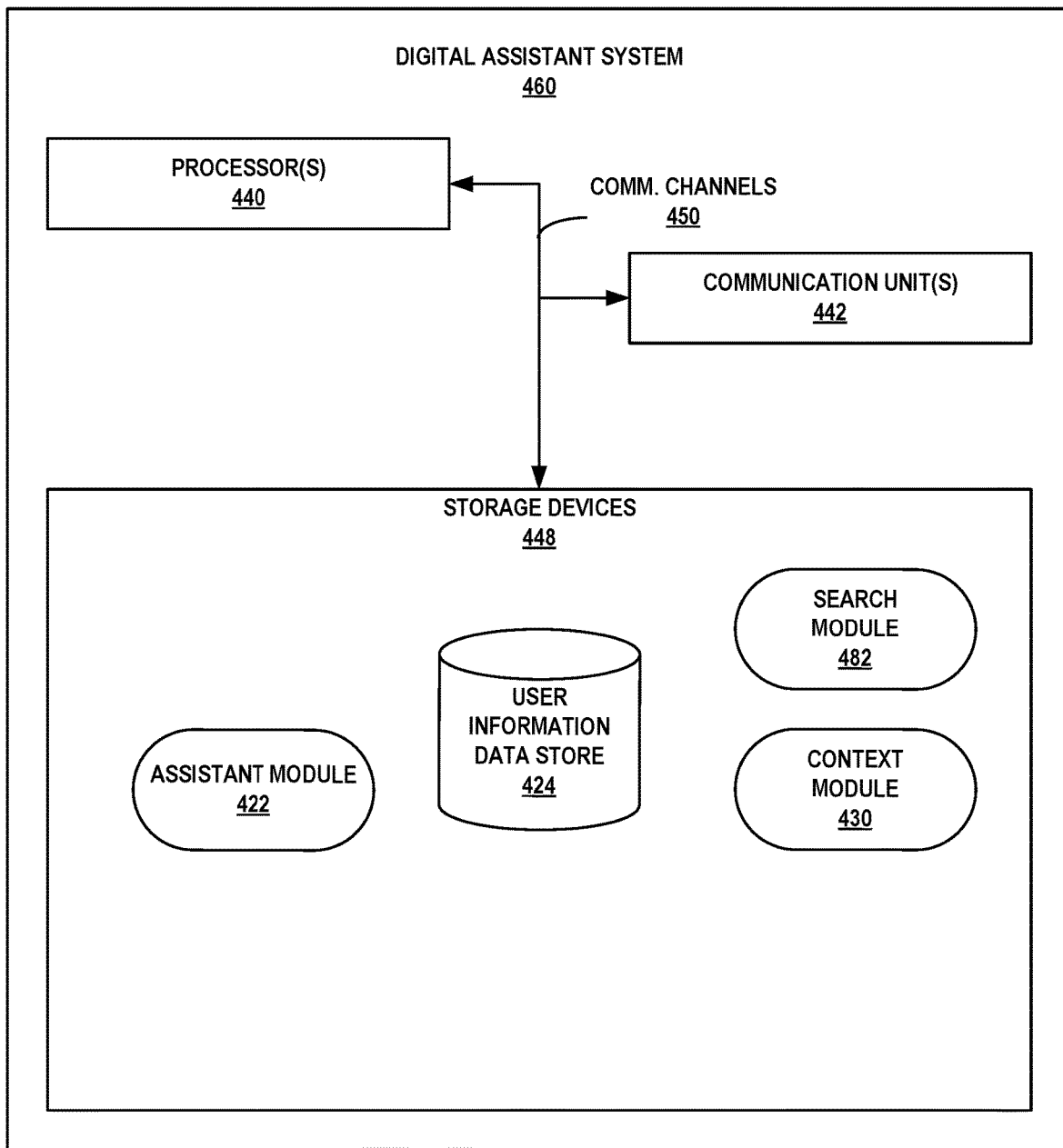
FIG. 4 is a block diagram illustrating an example computing device that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Assistant server system 460 of FIG. 4 is described below as an example of digital assistant system 160 of FIG. 1. FIG. 4 illustrates only one particular example of assistant server system 460, and many other examples of assistant server system 460 may be used in other instances and may include a subset of the components included in example assistant server system 460 or may include additional components not shown in FIG. 4.

As shown in the example of FIG. 4, assistant server system 460 includes user one or more processors 440, one or more communication units 442, and one or more storage components 448. Storage components 448 include assistant module 422, search module 482, context module 430, and user information data store 424.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Search module 482 of assistant server system 460 is analogous to search module 282 of computing device 210 and may perform integrated search functions on behalf of assistant server system 460. That is, search module 482 may perform search operations on behalf of assistant module 422. In some examples, search module 482 may interface with external search systems, such as search server system 180 to perform search operations on behalf of assistant module 422. When invoked, search module 482 may perform search functions, such as generating search queries and executing searches based on generated search queries across various local and remote information sources. Search module 482 may provide results of executed searches to the invoking component or module. That is, search module 482 may output search results to assistant module 422.

Context module 430 of assistant server system 460 is analogous to context module 230 of computing device 210. Context module 430 may collect contextual information associated with computing devices, such as computing device 110 of FIG. 1 and computing device 210 of FIG. 2, to define a context of the computing device. Context module 430 may primarily be used by assistant module 422 and/or search module 482 to define a context of a computing device interfacing and accessing a service provided by digital assistant system 160. The context may specify the characteristics of the physical and/or virtual environment of the computing device and a user of the computing device at a particular time.

Assistant module 422 may include all functionality of local assistant module 122A and remote assistant module 122B of FIG. 1, as well as assistant module 222 of computing device 210 of FIG. 2. Assistant module 422 may perform similar operations as remote assistant module 122B for providing an assistant service that is accessible via assistant server system 460. That is, assistant module 422 may act as an interface to a remote assistant service accessible to a computing device that is communicating over a network with assistant server system 460. For example, assistant module 422 may be an interface or API to remote assistant module 122B of digital assistant system 160 of FIG. 1. Assistant module 422 may rely on the information stored at data store 424, in addition to any information provided by context module 430 and/or search module 482, to perform assistant tasks.

The assistant provided by assistant module 422 may be configured to perform one or more tasks in the course of executing operations to satisfy verbal or spoken requests of users of a computing device (e.g., computing device 110 of FIG. 1). For instance, the assistant provided by assistant module 422 may receive, with one or more microphones of the computing device, acoustic input (e.g., audio data) that corresponds to an utterance a user of the computing device requesting performance of a particular task. The assistant provided by assistant modules 422 may analyze the audio data to identify a response to the spoken utterance.

Figure 5:
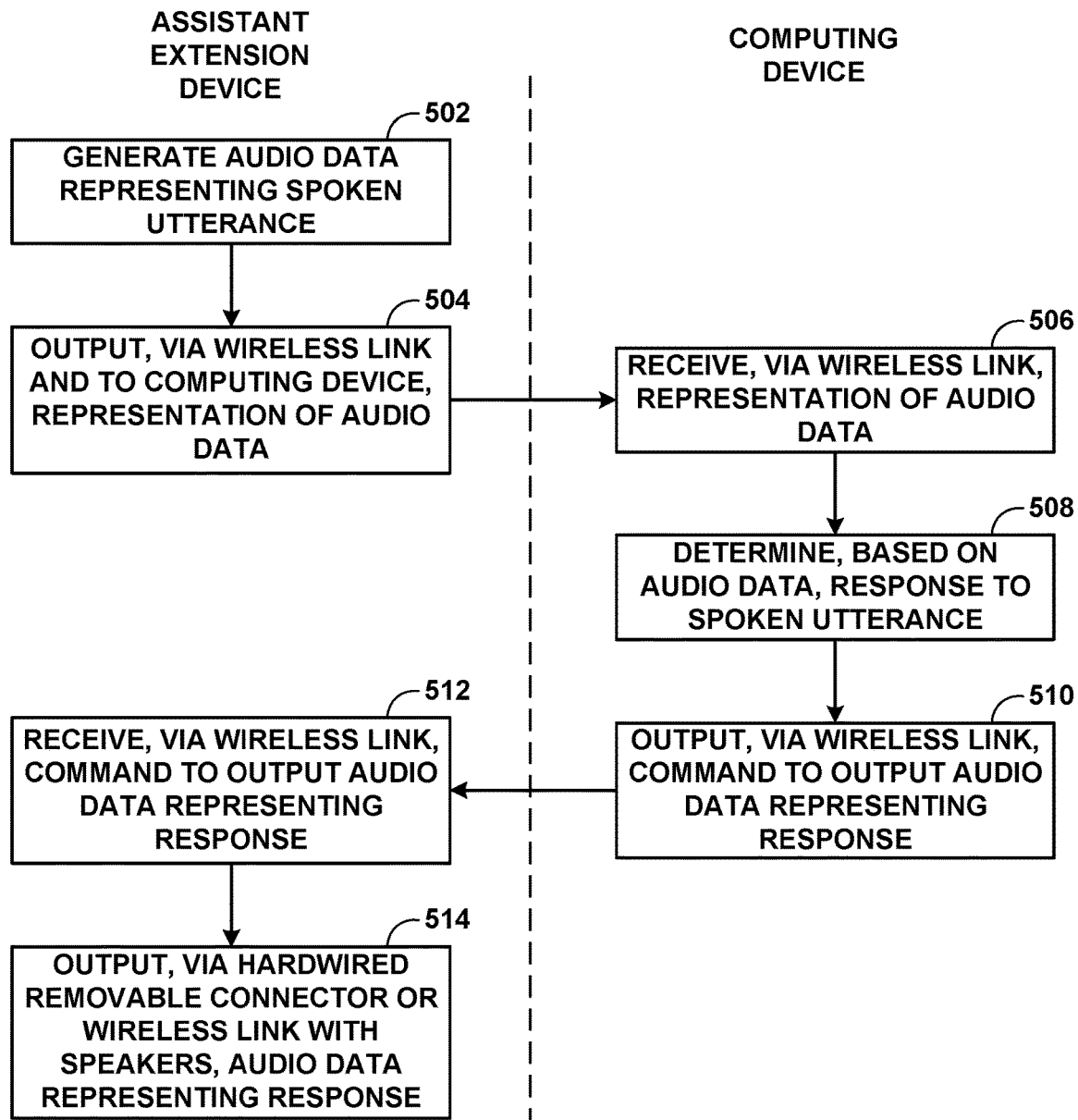
FIG. 5 is a flowchart illustrating example operations performed by a computing device including one or more processors executing an example virtual assistant and example operations performed by an assistant extension device, in accordance with one or more aspects of the present disclosure.

FIG. 5 is a flowchart illustrating example operations performed by a computing device including one or more processors executing an example virtual assistant and example operations performed by an assistant extension device, in accordance with one or more aspects of the present disclosure. For purposes of illustration only, FIG. 5 is described below within the context of computing device 110 and assistant extension device 111 of FIG. 1, although devices having configurations different than that of computing device 110 and assistant extension device 111 may perform the techniques of FIG. 5.

In operation, one or more microphones of assistant extension device 111 may generate audio data representing a spoken utterance detected by assistant extension device 111 (502). For instance, microphones 107 of assistant extension device 111 may generate audio data representing a spoken utterance of "What temperature is it outside?"

Assistant extension device 111 may output, via a wireless link between assistant extension device 111 and computing device 110, a representation of the audio data (504). For instance, in response to recognizing a spoken trigger phrase in audio data generated by microphones 107, assistant extension module 158 may output the representation of the audio data to computing device 110 via link 152 of FIG. 1. As discussed above, the wireless link between assistant device 111 and computing device 110 may be a Bluetooth link, a Wi-Fi link, or any other type of wireless data link.

Computing device 110 may receive, via the wireless link between computing device 110 and assistant extension device 111, the representation of the audio data (506), and determine, based on the audio data, a response to the spoken utterance (508). In some examples, computing device 110 may locally determine the response. For instance, local assistant module 122A of computing device 110 may determine the response without receiving data from other devices (e.g., without receiving data from digital assistant system 160 or search server system 180 of FIG. 1). In some examples, computing device 110 may determine the response outputting the audio data (or a representation of the audio data) to digital assistant system 160, which may provide computing device 110 with the response. For instance, remote assistant module 122B of digital assistant system 160 may determine the response and provide the determined response to computing device 110 via network 130.

Computing device 110 may output, via the wireless link between computing device 110 and assistant extension device 111, a command to output audio data representing the response (510). For instance, local assistant module 122A may send, via link 152 and to assistant extension module 158, a command for assistant extension device 111 to output, for playback by one or more speakers connected to assistant extension device 111 via a hardwired analog removable connector of assistant extension device 111 or a wireless link between assistant extension device 111 and the one or more speakers, audio data representing the response to the spoken utterance. In some examples, the command may include a representation of the audio data to be output. In some examples, the command may include a text or other representation of the response and assistant extension device 111 may synthesize voice data based on the text representation of the response.

Assistant extension device 111 may receive the command (512), and output, via the hardwired removable connector or the wireless link between assistant extension device 111 and the one or more speakers, the audio data representing the response to the spoken utterance (514). In some examples, the command may specify which speakers are to be used for playback (e.g., the command may specify one or both of speakers connected via the hardwired analog removable connector or speakers connected via the wireless link between assistant extension device 111 and the one or more speakers). In some examples, the command may not specify which speakers are to be used for playback, and assistant extension device 111 may select which speakers to use. For instance, if there are not speakers connected to assistant extension device 111 via a wireless link, assistant extension device 111 may output the audio data for playback by speakers connected to the hardwired analog removable connector.

The following examples may illustrate one or more aspects of the disclosure:

Example 1

A method comprising: receiving, by a computational assistant executing at one or more processors of a mobile computing device and via a wireless link between the mobile computing device and an external device, a representation of audio data generated by one or more microphones of the external device, the audio data representing a spoken utterance detected by the external device; determining, by the computational assistant and based on the audio data, a response to the spoken utterance; and sending, by the mobile computing device, to the external device, and via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

Example 2

The method of example 1, wherein the hardwired analog removable connector comprises a 3.5 millimeter audio jack.

Example 3

The method of any combination of examples 1 and 2, wherein the computational assistant determines the response to the spoken utterance based on data received from a general-purpose assistant system via a network.

Example 4

The method of example 3, wherein the network comprises the Internet, and wherein the external device does not have an Internet connection.

Example 5

The method of any combination of examples 1-4, wherein the computational assistant is a general purpose computational assistant.

Example 6

The method of any combination of examples 1-5, wherein the computational assistant is a personalized to the user.

Example 7

A mobile computing device comprising: one or more communication units configured to establish a wireless link between the mobile computing device and an external device; one or more microphones; one or more speakers; and one or more processors configured to execute a computational assistant configured to: receive, via the wireless link between the mobile computing device and the external device, a representation of audio data generated by one or more microphones of the external device, the audio data representing a spoken utterance detected by the external device; determine, based on the received audio data, a response to the spoken utterance; and output, via the wireless link between the mobile computing device and the external device, a command to output, for playback by one or more speakers connected to the external device via a hardwired analog removable connector of the external device or a wireless link between the external device and the one or more speakers, audio data representing the response to the spoken utterance.

Example 8

The mobile computing device of example 7, wherein one or more microphones of the external device include at least one far-field microphone, and wherein one or more microphones of the mobile computing device do not a far-field microphone.

Example 9

The mobile computing device of any combination of examples 7 and 8, wherein, to determine the response to the spoken utterance, the computational assistant is configured to: receive, via connection to a network provided by one or more of the communication units, data from a general-purpose assistant system.

Example 10

The mobile computing device of example 9, wherein the network comprises the Internet, and wherein the external device does not have an Internet connection.

Example 11

A computer-readable storage medium storing instructions that, when executed, cause one or more processors a mobile computing device to perform the method of any combination of examples 1-6.

Example 12

A mobile computing device comprising means for performing the method of any combination of examples 1-6.

Example 13

A method comprising: generating, by one or more microphones of a device, audio data representing a spoken utterance detected by the device; outputting, by the device and via a wireless link between the device and an external computing device, a representation of the audio data; receiving, by the device and via the wireless link between the device and the external computing device, a command for the device to output, for playback by one or more speakers connected to the device via a hardwired analog removable connector of the device or a wireless link between the device and the one or more speakers, audio data representing a response to the spoken utterance; and outputting, by the device and via the hardwired removable connector or the wireless link between the device and the one or more speakers, the audio data representing the response to the spoken utterance.

Example 14

The method of example 13, wherein the device does not have an Internet connection.

Example 15

The method of any combination of examples 13 and 14, wherein the one or more microphones of the device comprise at least one far-field microphone.

Example 16

The method of any combination of examples 13-15, wherein the response to the spoken utterance is generated by a computation assistant executing at least in part at one or more processors of the external computing device.

Example 17

The method of any combination of examples 13-16, wherein the hardwired analog removable connector comprises a 3.5 millimeter audio jack.

Example 18

The method of any combination of examples 13-17, further comprising: determining whether the audio data includes a trigger phrase, wherein outputting the representation of the audio data comprises outputting the representation of the audio data in response to determining that the audio data includes the trigger phrase.

Example 19

A device comprising: one or more communication units configured to establish a wireless link between the device and an external computing device at which a computational assistant is executing; one or more microphones, including at least one far-field microphone; a hardwired analog removable audio connector; and one or more processors configured to: receive, from the one or more microphones, audio data representing a spoken utterance detected by the device; output, via the wireless link between the device and the external computing device, a representation of the audio data; receive, via the wireless link between the device and the external computing device, a command for the device to output, for playback by one or more speakers connected to the device via the hardwired analog removable audio connector of the device, audio data representing a response to the spoken utterance; and output, via the hardwired removable audio connector, the audio data representing the response to the spoken utterance.

Example 20

The device of example 19, wherein the hardwired analog removable audio connector comprises a 3.5 millimeter audio jack.

Example 21

The device of any combination of examples 19 and 20, wherein the one or more processors are further configured to: output the representation of the audio data comprises outputting the representation of the audio data in response to determining that an activation action has occurred.

Example 22

The device of any combination of examples 19-21, wherein determining that an activation action has occurred comprises one or both of: determining that audio data generated by the one or more microphones includes a trigger phrase; and determining that a speech reception button of the device has been activated.

Example 23

A computer-readable storage medium storing instructions that, when executed, cause one or more processors a device to perform the method of any combination of examples 13-18.

Example 24

A device comprising means for performing the method of any combination of examples 13-18.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
receiving, by a computational assistant executing at one or more processors of a mobile computing device and via a wireless Bluetooth link between the mobile computing device and an external assistant extension device, a representation of audio data generated by one or more microphones of the external assistant extension device, the audio data representing a spoken utterance detected by the external assistant extension device,
wherein the mobile computing device has an Internet connection and is able to communicate, via the Internet connection, with a remote general-purpose assistant system,
wherein the external assistant extension device does not have the Internet connection and is not able to communicate with the remote general-purpose assistant system,
wherein the external assistant extension device is connected to a first external speaker and is connected to a second external speaker,
wherein the external assistant extension device includes a hardwired removable connector, and
wherein the external assistant extension device is connected to the first external speaker via a cable that is connected to the hardwired removable connector;
determining, by the computational assistant and based on the audio data, a response to the spoken utterance; and
sending, by the mobile computing device, to the external assistant extension device, and via the wireless Bluetooth link between the mobile computing device and the external assistant extension device, a command to output, for playback, audio data representing the response to the spoken utterance,
wherein the command specifies which, of the first external speaker connected to the external assistant extension device and the second external speaker connected to the external assistant extension device, are to be used by the external assistant extension device for playback of the audio data.

2. The method of claim 1, wherein the hardwired removable connector comprises a 3.5 millimeter audio jack.

3. The method of claim 1, further comprising:
transmitting, via the Internet connection and by the computational assistant, the representation of the audio data to the remote general-purpose assistant system;
receiving, by the computational assistant, data from the remote general-purpose assistant, the date received via the Internet connection and in response to the transmitting; and
determining the response to the spoken utterance based on the data received from the general-purpose assistant system via the Internet connection.

4. The method of claim 1, wherein the computational assistant is personalized to the user, and wherein the response is personalized to the user.

5. The method of claim 1, wherein the assistant extension device lacks an internal speaker.

6. The method of claim 1, wherein the external assistant extension device is connected to the second speaker via a wireless Bluetooth link between the external assistant extension device and the second speaker.

7. A method comprising:
determining, by an assistant extension device, that an activation action has occurred, wherein the assistant extension device does not have an Internet connection and is not able to communicate with a digital assistant system;
generating, by one or more microphones of the assistant extension device, audio data representing a spoken utterance detected by the assistant extension device after the activation action occurred;
outputting, by the assistant extension device and to an external smartphone via a wireless Bluetooth link between the assistant extension device and the external smartphone, a representation of the audio data, wherein outputting the representation of the audio data is in response to the audio data being captured after the activation action occurred, and wherein the external smartphone has the Internet connection and is able to communicate, via the Internet connection, with the digital assistant system;

receiving, by the assistant extension device and from the external smartphone via the wireless Bluetooth link between the assistant extension device and the external smartphone, a command for the assistant extension device to output, for playback by one or more external speakers connected to the assistant extension device via a hardwired analog removable connector of the assistant extension device or a wireless Bluetooth link between the assistant extension device and the one or more external speakers, audio data representing a response to the spoken utterance, wherein the audio data is generated by the external smartphone through communications, by a local assistant module of the external smartphone, with the digital assistant system; and outputting, by the assistant extension device and via the hardwired removable connector or the wireless Bluetooth link between the assistant extension device and the one or more external speakers, the audio data representing the response to the spoken utterance.

8. The method of claim 7, wherein the one or more microphones of the assistant extension device comprise at least one far-field microphone.

9. The method of claim 7, wherein determining, by the assistant extension device, that the activation action has occurred, comprises:

generating, by the one or more microphones of the assistant extension device, preceding audio data detected by the assistant extension device before the spoken utterance;

determining whether the preceding audio data includes a trigger phrase; and determining that the activation action has occurred in response to determining that the preceding audio data includes the trigger phrase.

10. The method of claim 7, wherein the external assistant extension device lacks an internal speaker.

11. The method of claim 7, wherein determining, by the assistant extension device, that the activation action has occurred, comprises:

determining that a speech reception button of the assistant extension device has been activated.

12. The method of claim 7, wherein the one or more external speakers connected to the assistant extension device include both a first external speaker connected via the hardwired removable connector and one or more external speakers connected via the wireless Bluetooth link.

13. A mobile computing device comprising:

one or more communication units configured to establish a wireless Bluetooth link between the mobile computing device and an external assistant extension device, wherein the external assistant extension device does not have an Internet connection;

one or more near-field microphones;

one or more speakers; and one or more processors configured to execute a computational assistant configured to:

receive, from the external assistant extension device via the wireless Bluetooth link between the mobile computing device and the external assistant extension device, a representation of audio data generated by one or more microphones of the external assistant extension device, the one or more microphones of the external assistant extension device including one or more far-field microphones, and the audio data representing a spoken utterance detected by the external assistant extension device, wherein the external assistant extension device includes a hardwired analog removable connector, and wherein the external assistant extension device is connected to a separate external speaker via a cable that is connected to the hardwired removable connector;

determine, based on the received audio data and through Internet connection with a remote digital assistant system, a response to the spoken utterance, wherein, to determine the response to the spoken utterance, the computational assistant is configured to:

transmit, via the Internet connection provided by one or more of the communication units, the representation of the audio data to the remote digital assistant system;

receive, responsive to the transmitting and via connection to the Internet provided by one or more of the communication units, data from the remote digital assistant system; and determine the response based on the data received from the remote digital assistant system; and output, to the external assistant extension device via the wireless Bluetooth link between the mobile computing device and the external assistant extension device, a command to output, for playback by the separate external speaker connected to the external assistant extension device via the hardwired analog removable connector of the external assistant extension device, audio data representing the response to the spoken utterance.

14. The mobile computing device of claim 13, wherein the one or more microphones of the mobile computing device do not include a far-field microphone.

15. An assistant extension device comprising:

one or more communication units configured to establish a wireless Bluetooth link between the assistant extension device and an external smartphone at which a computational assistant is executing, wherein the assistant extension device does not have an Internet connection and is not able to communicate with a digital assistant system;

one or more microphones, including at least one far-field microphone;

a hardwired analog removable audio connector; and one or more processors configured to:

determine that an activation action has occurred;

generate, from the one or more microphones, audio data representing a spoken utterance detected by the assistant extension device after the activation action occurred;

output, to the external smartphone via the wireless Bluetooth link between the assistant extension device and the external smartphone, a representation of the audio data, wherein outputting the representation of the audio data is in response to the audio data being captured after the activation action occurred, and wherein the external smartphone has the Internet connection and is able to communicate, via the Internet connection, with the digital assistant system;

receive, from the external smartphone via the wireless Bluetooth link between the assistant extension device and the external smartphone, a command for the assistant extension device to output, for playback by one or more external speakers connected to the assistant extension device via the hardwired analog removable audio connector of the assistant extension device, audio data representing a response to the spoken utterance, wherein the audio data is generated by the external smartphone through communications, by a local assistant module of the smartphone, with the digital assistant system; and output, via the hardwired removable audio connector, the audio data representing the response to the spoken utterance.

16. The device of claim 15, wherein the hardwired analog removable audio connector comprises a 3.5 millimeter audio jack.

\* \* \* \* \*